United States Patent Office 3,285,857
Patented Nov. 15, 1966

3,285,857
STABILIZED METHYL CHLOROFORM
COMPOSITION
Peter Rathbone and Charles Walter Suckling, Widnes, England, assignors to Imperial Chemical Industries Limited, London, England, a corporation of Great Britain
No Drawing. Filed Oct. 26, 1962, Ser. No. 233,422
Claims priority, application Great Britain, Oct. 30, 1961, 38,708/61; June 7, 1962, 22,081/62
12 Claims. (Cl. 252—171)

This invention relates to a stabilized solvent, more particularly methyl chloroform stabilized against metal-catalyzed decomposition.

It is known that chlorinated hydrocarbons tend to decompose in a variety of ways during transport, storage and use. Of the chlorinated hydrocarbons, methyl chloroform is particularly useful for its solvent properties, especially in degreasing metal articles, but tends to undergo a particularly troublesome decomposition by self-condensation, leading to the production of acidity, and this reaction is known to be catalyzed by certain metals, notably aluminium and aluminum alloys. Such decomposition is also more prone to occur under the influence of heat.

This decomposition is highly undesirable on account of the corrosive effects of the acidity produced and because, in the presence of active metals, the reaction can become very vigorous with the formation of large quantities of tarry matter in the solvents.

In metal degreasing processes the chlorinated solvents may be used cold or hot, often at the boiling point, for removing oil, grease and fatty compounds together with bound insoluble matter from the surface of metal articles. Acidity developing in the solvent can cause troublesome corrosion of the degreasing plant structure and, furthermore, when articles containing reactive materials such as aluminum are degreased in the solvents, the acid (principally hydrochloric acid) can attack the metal with the formation of metal chlorides. Fine particles of metal are also often present on the surface of metal articles to be treated in a degreasing plant; these particles are washed from the metal surface together with the grease and dirt by the degreasing solvent and tend to accumulate in the plant. Such finely divided material, when it contains aluminum or similarly reactive metals, will react even more readily with any hydrochloric acid present to form metal chlorides. It is known that aluminium or aluminum chloride strongly catalyses the decomposition of methyl chloroform, and the decomposition once started can, in the presence of aluminum, quickly build up to troublesome proportions.

Addition of an aliphatic monoketone, i.e., an alkanone, gives a degree of stabilization which is satisfactory for many purposes, particularly for degreasing at temperatures at or near atmospheric temperatures (the so-called "cold-cleaning" methods), but it is more difficult to secure a lasting stabilizing effect when the methyl chloroform is used at boiling temperatures, as in vapour degreasing plants. In this respect methylchloroform is more difficult to stabilize than the commoner solvents, for example trichloroethylene and perchloroethylene. Aluminium and certain aluminium alloys are especially active in attacking the solvent at these higher temperatures when in the form of swarf, and an alloy which is particularly active in this respect is composed of aluminum 75%, zinc 20% and silicon 5%.

It has now been found that methyl chloroform can be stabilized much more efficiently, and particularly against the action of aluminium and aluminum alloys in the form of swarf at temperatures near the boiling point of the solvent, when a small proportion of a nitro alkane or a mixture of nitroalkanes is added as stabilizer in addition to the aliphatic monoketone.

Thus according to the present invention there is provided an improved method of stabilizing methyl chloroform against metal-induced decomposition which comprises incorporating therein an aliphatic monoketone and a nitroalkane.

We have also found that the stability of the methyl chloroform can be improved still further by the addition of an epoxide as well as the ketone and nitroalkane. The epoxide provides additional stability under the more rigorous conditions of use, as for example when the solvent is used at or near its boiling point, and especially when the hot solvent is in contact with mild steel. In general, the ketone and nitroalkane stabilizers together provide an ample degree of stability for solvent likely to contact aluminum and its alloys, but the epoxide should be incorporated if the solvent is likely to contact mild steel.

The aliphatic monoketones, nitroalkanes and epoxides are generally soluble in methyl chloroform and, as they generally do not react with the oil, grease and fatty compounds present on the surface of the articles which are commonly degreased in such solvents, are therefore suitable for continuous use as stabilizers in methyl chloroform. In conventional metal degreasing processes the work pieces may be treated in the boiling solvent or its vapor, and it will be understood that in either case solvent vapour is continuously being liberated from a bulk or boiling liquid and must consequently be condensed back to the liquid state. Even if the solvents are used cold, as is often the case with methyl chloroform, the accumulation of grease and dirt in the solvent during the degreasing process makes it economically desirable that the dirty solvent should be redistilled to recover valuable clean solvent. For a stabilizer to be suitable in industrial practice, therefore, it should not only be capable of performing its chemically stabilizing function but should also be such that it is not appreciably separated from the methyl chloroform during distillation. For this reason we prefer to limit the ketone stabilizers for use in the process of the present invention to those aliphatic monoketones whose normal boiling points (i.e. at normal atmospheric pressure) do not exceed 130° C. although higher boiling ketones have some stabilizing action. We prefer to employ methyl ethyl ketone since it provides a very good stabilizing effect and has a boiling point (80° C.) close to the boiling point of the chlorinated solvent. The lower-boiling acetone is also useful particularly in methyl chloroform used for metal degreasing in the cold, under conditions which do not tend to cause separation of the low-boiling stabilizer by distillation of the solvent. The higher boiling ketones within the range herein-before specified, for example isopropyl methyl ketone and diethyl ketone, are also useful inhibiters of the metal-catalyzed decomposition reaction. Mixtures of aliphatic ketones may be used if desired.

For effective stabilization the quantity of ketone stabilizer required depends to some extent on the particular ketone used and the conditions under which it is to be employed. The proportion of ketone stabilizer required is usually in the range 2 to 5% by weight, but larger amounts, up to approximately 10% by weight may be used if desired. Smaller amounts provide a stabilizing effect, but in commercial practice it is advisable for a minimum of 2% by weight of the ketone stabilizer to be present.

The nitroalkanes, which also described as nitro paraffins, may be added in proportions up to about 2% by weight of the methyl chloroform, though greater proportions may be used if desired. The efficiency of the various nitroalkanes varies, so the optimum proportions are not necessarily the same for all the nitroalkanes. In general, it is found that it is satisfactory to use a proportion of nitroalkane which is appreciably less than the proportion of aliphatic monoketone used. Suitable nitroalkanes for use in the process of the present invention include nitromethane, nitroethane, 1-nitropropane and 2-nitropropane. Mixtures of nitro alkanes can also be used if desired, for example a mixture of nitromethane and nitroethane. It is preferred to use nitromethane since it is most efficient and also has the most suitable boiling point, and especially suitable proportions in the case of nitromethane are between 0.1 and 1% by weight of the methyl chloroform. The preferred proportions in the case of the higher nitroalkanes such as nitroethane are between 0.5% and 2% by weight of the methyl chloroform.

The epoxide is likewise preferably one which has a boiling point and/or solubility which minimizes separation of the epoxide from the solvent under the conditions of use. For this reason, epoxides boiling below about 45° C. at normal atmospheric pressure are too volatile for satisfactory use except under conditions which retain them in the solvent. Aliphatic epoxides are very suitable, particularly those having a normal boiling point not exceeding 130° C., for example epichlorhydrin and the butene oxides. Other epoxides which may be used include such aromatic epoxides as styrene oxide and α-pinene oxide. The butene oxides are to be preferred, as these are especially effective. Mixtures of epoxides may be used if desired.

The proportion of epoxide may be up to 5% and is preferably between 0.2% and 1.0% by weight of the methyl chloroform. Larger amounts may be used if desired, but these tend to have little additional effect.

It must be understood that the stabilizers of the present invention may furthermore be used in conjunction with conventional stabilizing systems. For example it is known that decomposition of chlorinated hydrocarbons can occur by oxidation under the influence of light and heat, with the development of acidity, and it has been proposed to inhibit this type of decomposition by the use of various additives, for instance antioxidants and acid-acceptors. Accordingly, when the ketone stabilizers of the present invention are incorporated in methyl chloroform to inhibit the metal-catalyzed decomposition, conventional preservatives may also be present if desired.

The invention is illustrated but not limited by the following examples in which the parts and percentages are by weight.

EXAMPLE 1

100 parts of a methyl chloroform composition containing 5% methyl ethyl ketone and 1% of nitromethane (the other 94% being methyl chloroform) was boiled under reflux conditions in glass apparatus with 10 parts of an aluminum alloy swarf of composition aluminum 75%, zinc 20%, silicon 5%. No violent reaction had occurred after refluxing had been continued for a period of 250 hours.

For purposes of comparison, this procedure was repeated using other methyl chloroform compositions, with the following results:

(a) Methyl chloroform with no added stabilizer. Violent reaction set in immediately.

(b) Methyl chloroform composition containing 5% of methyl ethyl ketone. A violent reaction did not occur until after 4 hours' refluxing.

(c) Methyl chloroform composition containing 1% of nitromethane. The mixture became black and tarry, and in some cases had reacted violently, within 10 hours.

(d) Methyl chloroform composition containing 0.5% nitromethane. The liquid rapidly darkened and a violent reaction commenced after 50 minutes' refluxing.

EXAMPLE 2

The procedure of Example 1 was repeated using a methyl chloroform composition containing 5% of methyl ethyl ketone and 1% nitroethane. The liquid became yellowish-brown in color after refluxing for 40 hours, but a violent reaction did not occur until after 118 hours' refluxing.

When this procedure was repeated using a methyl chloroform composition containing 1% nitroethane but no methyl ethyl ketone, a violent reaction occurred after 112 minutes' refluxing.

EXAMPLE 3

The procedure of Example 1 was repeated using a methyl chloroform composition containing 5% of methyl ethyl ketone, 0.5% of nitroethane and 0.25 of nitromethane. No violent reaction occurred until after 180 hours' refluxing.

EXAMPLE 4

A mixture of 95 parts of methyl chloroform, 5 parts of methyl ethyl ketone and 1 part of nitroethane was placed in a bench model two-compartment degreasing machine; 3 liters in the vapor compartment and 9 liters in the liquid compartment. 100 grams of an aluminium alloy swarf containing aluminium 75%, zinc 20% and silicon 5% were then placed in the sump of the vapor compartment and refluxing of the solvent was commenced. After refluxing for a period of 47 hours, the liquid in the vapor compartment was pale yellow in color, but the liquid in the liquid compartment was still colorless and no violent reaction had taken place.

When the procedure of this example was repeated using a mixture of 95 parts of methyl chloroform with 5 parts of methyl ethyl ketone but not nitroethane, the liquid became sour very quickly, and a violent reaction occurred after boiling for 4 hours. Dense fumes of hydrogen chloride were evolved and black tarry products were produced.

EXAMPLE 5

The procedure of Example 2 was repeated using a methyl chloroform composition containing 0.25% of butene oxide (a commercial product containing approximately 80% of 2,3-epoxybutane and 20% of 1,2-epoxybutane) in addition to 5% of methyl ethyl ketone and 1% of nitroethane. The results observed were similar to those obtained when the butene oxide was not included.

EXAMPLE 6

The methyl chloroform composition under test (200 ml.) was boiled under reflux conditions and a mild steel strip (75 mm. by 13 mm.) was suspended by a polytetrafluoroethylene supporting tape so that the metal was partly immersed in the boiling liquid. At intervals, a 5 ml. sample of the methylchloroform was withdrawn and stirred for 1 minute with 10 ml. of water of pH 7.0. The pH of the resulting mixture was then measured, and the developed acidity was titrated with 0.01 N sodium hydroxide using bromocresol purple as indicator. The tests were carried out in duplicate, and the results obtained are tabulated below.

*Table 1*

| Composition | After 3 days | After 7 days |
|---|---|---|
| Methyl chloroform containing 5% methyl ethyl ketone, 1% nitroethane: | | |
| pH | 6.2; 6.5 | 2.8; 2.5 |
| Acidity (ml. of 0.01 N NaOH) | 0.7; 0.1 | 16.0; 21.4 |
| Methylchloroform containing 5% methyl ethyl ketone, 1% nitroethane, 0.25% butene oxide: | | |
| pH | 6.7; 6.8 | 6.5; 6.4 |
| Acidity (ml. of 0.01 N NaOH) | 0.2; 0.2 | 0.2; 0.2 |

Further tests, in which measurements were also made of the color of the solvent composition (in Hazen units) and the weight loss of the mild steel strip (in milligrams) after 14 days, are summarized in the following Table 2.

*Table 2*

| Additives in methylchloroform | Days | | | | Colour | Weight Loss |
|---|---|---|---|---|---|---|
| | 4 | 7 | 10 | 14 | | |
| 5% MEK, 1% nitroethane: | | | | | Very dark brown | 25 |
| pH | | 2.9 | 3.0 | 2.7 | | |
| Acidity | | 16 | 12 | 13 | | |
| Chloride | | 2 | 7 | 36 | | |
| 5% MEK, 1% nitroethane, 0.25% butene oxide: | | | | | 70 | 0.4 |
| pH | | 6.6 | 5.8 | 5.6 | | |
| Acidity | | Nil | Nil | Nil | | |
| Chloride | | Nil | Nil | 6 | | |
| 5% MEK, % nitroethane, 0.25% epichlorhydrin: | | | | | 50 | 7 |
| pH | 6.3 | 6.2 | 5.3 | 4.9 | | |
| Acidity | Nil | Nil | Nil | Nil | | |
| Chloride | 1 | 3 | 1 | 1 | | |
| 5% MEK, 1% nitroethane, 0.25% styrene oxide: | | | | | 125 | 6 |
| pH | 6.4 | 6.9 | 5.3 | 4.7 | | |
| Acidity | Nil | Nil | Nil | Nil | | |
| Chloride | 2 | 4 | 2 | 2 | | |
| 5% MEK, 1% nitroethane, 0.25% α pinene oxide: | | | | | Yellow >250 | 4 |
| pH | 4.7 | 4.7 | 4.4 | 4.3 | | |
| Acidity | 1 | 2 | Nil | 2 | | |
| Chloride | 1 | 1 | 3 | 1 | | |
| 5% MEK, 0.5% nitromethane: | | | | | Black and tarry | 146 |
| pH | 2.8 | 2.4 | 2.5 | 2.0 | | |
| Acidity | 12 | 23 | 60 | 75 | | |
| Chloride | 5 | 6 | 11 | 17 | | |
| 5% MEK, 0.5% nitromethane, 0.25% butene oxide: | | | | | Yellow >250 | 5 |
| pH | 4.2 | 3.9 | 4.0 | 4.2 | | |
| Acidity | 1 | 1 | 1 | 1 | | |
| Chloride | 1 | 2 | 3 | 2 | | |
| 5% acetone, 1% nitroethane: | | | | | Dark brown >250 | 24 |
| pH | 5.9 | 5.8 | 2.5 | 2.0 | | |
| Acidity | Nil | Nil | 13 | 9 | | |
| Chloride | 1 | Nil | 5 | 4 | | |
| 5% acetone, 1% nitroethane, 0.25% butene oxide: | | | | | 85 | 7 |
| pH | 6.3 | 6.6 | 5.7 | 6.2 | | |
| Acidity | Nil | Nil | Nil | Nil | | |
| Chloride | Nil | 1 | Nil | 1 | | |

In this table, MEK denotes methyl ethyl ketone. The developed acidity was determined by titration with 0.01 N sodium hydroxide using bromocresol purple indicator. The chloride ion concentration was determined potentiometrically. The acidity and chloride are expressed in terms of ml. of 0.01 N reagent (sodium hydroxide and silver nitrate respectively).

The butene oxide used was the commercial mixture as used in Example 5.

What we claim is:

1. A process for degreasing a metal which comprises contacting the metal to be degreased with a composition consisting essentially of said methyl chloroform and, as a stabilizer therefor, a mixture of alkanone having a normal boiling point not exceeding 130° C. and a nitroalkane selected from the group consisting of nitromethane, nitroethane, 1-nitropropane, 2-nitropropane and mixtures thereof, said alkanone and nitroalkane being present in amount sufficient to provide a stabilizing effect against metal-induced decomposition of said methyl chloroform.

2. Process as claimed in claim 1 wherein the alkanone is methyl ethyl ketone.

3. Process as claimed in claim 1 wherein the proportion of alkanone is in the range 2% to 10% by weight of the methyl chloroform.

4. Process as claimed in claim 1 wherein the proportion of nitroalkane is about 0.5 to 2% by weight of the methyl chloroform.

5. Process as claimed in claim 1 wherein the nitroalkane is nitromethane.

6. Process as claimed in claim 5 wherein the proportion of nitromethane is between 0.1% and 1% by weight of the methyl chloroform.

7. A process for degreasing a metal which comprises contacting the metal to be degreased with a composition consisting essentially of methylchloroform and, as a stabilizer therefor, a mixture of alkanone having a normal boiling point not exceeding 130° C., a nitroalkane selected from the group consisting of nitromethane, nitroethane, 1-nitropropane, 2-nitropropane and mixtures thereof, and an epoxide selected from the group consisting of epichlorhydrin, butene oxides, styrene oxide and α-pinene oxide, said alkanone, nitroalkane and epoxide being present in amount sufficient to provide a stabilizing effect against metal-induced decomposition of said methyl chloroform.

8. Process as claimed in claim 7 wherein the epoxide is a butene oxide.

9. Process as claimed in claim 7 wherein the proportion of epoxide is about 0.2 to 5% by weight of the methyl chloroform.

10. Process claimed in claim 9 wherein the proportion of epoxide is between 0.2% and 1.0% by weight of the methyl chloroform.

11. A stabilized solvent composition consisting essentially of methyl chloroform containing from about 2 to 5% of an alkanone having a normal boiling point not exceeding 130° C. and 0.5 to 2% by weight of a nitroalkane selected from the group consisting of nitromethane, nitroethane, 1-nitropropane, 2-nitropropane and mixtures thereof.

12. A stabilized solvent composition consisting essentially of methyl chloroform containing from about 2 to 5% of an alkanone having a normal boiling point not exceeding 130° C., 0.5 to 2% by weight of a nitroalkane selected from the group consisting of nitromethane, nitroethane, 1-nitropropane, 2-nitropropane and mixtures thereof, and about 0.2 to 5% by weight of an epoxide selected from the group consisting of epichlorhydrin, butene oxides, styrene oxide and α-pinene oxide.

(References on following page)

References Cited by the Examiner

UNITED STATES PATENTS

| | | | |
|---|---|---|---|
| 2,371,645 | 3/1945 | Aitcheson et al. | 260—652.5 X |
| 2,436,772 | 2/1948 | Klabunde | 260—652.5 X |
| 2,567,621 | 9/1951 | Skeeters et al. | 260—652.5 X |
| 2,947,792 | 8/1960 | Skeeters | 260—652.5 |

FOREIGN PATENTS

| | | |
|---|---|---|
| 590,102 | 10/1960 | Belgium. |
| 98,863 | 9/1961 | Norway. |

LEON ZITVER, *Primary Examiner.*

M. JACOB, *Assistant Examiner.*